(12) United States Patent
Prado et al.

(10) Patent No.: US 11,120,031 B2
(45) Date of Patent: Sep. 14, 2021

(54) AUTOMATIC INDEXING OF RELEVANT DOMAINS IN A DATA LAKE FOR DATA DISCOVERY AND INTEGRATION

(71) Applicant: EMC IP Holding Company LLC, Hopkinton, MA (US)

(72) Inventors: Adriana Bechara Prado, Niterói (BR); Vitor Silva Sousa, Niterói (BR); Marcia Lucas Pesce, Rio de Janeiro (BR); Paulo de Figueiredo Pires, Rio de Janeiro (BR); Fábio André Machado Porto, Petrópolis (BR); Altobelli de Brito Mantuan, Niterói (BR); Rodolpho Rosa da Silva, Rio de Janeiro (BR); Wagner dos Santos Vieira, Rio de Janeiro (BR)

(73) Assignee: EMC IP Holding Company LLC, Hopkinton, MA (US)

(*) Notice: Subject to any disclaimer, the term of this patent is extended or adjusted under 35 U.S.C. 154(b) by 126 days.

(21) Appl. No.: 16/669,678

(22) Filed: Oct. 31, 2019

(65) Prior Publication Data
US 2021/0133189 A1    May 6, 2021

(51) Int. Cl.
*G06F 17/00* (2019.01)
*G06F 16/2458* (2019.01)
(Continued)

(52) U.S. Cl.
CPC ...... *G06F 16/2465* (2019.01); *G06F 16/2255* (2019.01); *G06F 16/285* (2019.01); *G06N 20/00* (2019.01)

(58) Field of Classification Search
CPC ............... G06F 16/2465; G06F 16/285; G06F 16/2255; G06N 20/00
See application file for complete search history.

(56) References Cited

U.S. PATENT DOCUMENTS

2018/0203917 A1*  7/2018  Marshall ............... G06F 16/285
2019/0079991 A1*  3/2019  Gao ....................... G06F 16/137
(Continued)

OTHER PUBLICATIONS

John Foley, Michael Bendersky, and Vanja Josifovski. 2015. Learning to Extract Local Events from the Web. In Proceedings of the 38th International ACM SIGIR Conference on Research and Development in Information Retrieval (SIGIR '15). Association for Computing Machinery, pp. 423-432, Aug. 2015.*

(Continued)

*Primary Examiner* — Greta L Robinson
(74) *Attorney, Agent, or Firm* — Ryan, Mason & Lewis, LLP

(57) ABSTRACT

Techniques are provided for data discovery and data integration in a data lake. One method comprises obtaining data files from a data lake, wherein each data file comprises multiple records having multiple fields; selecting multiple candidate fields from a data file based on a record type; determining a relevance score for each candidate field from the data file based on multiple features extracted from the data file; and clustering the scored candidate fields into clusters of similar domains using a hashing algorithm, wherein a given cluster comprises candidate fields, wherein multiple data files can be integrated based on a domain of the candidate fields in the given cluster. The relevance score for each candidate field is based on multiple features comprising, for example, features that take into account a morphological or semantic similarity between file name, file metadata and/or file records and features that consider statistics of candidate fields in a data file.

20 Claims, 11 Drawing Sheets

(51) Int. Cl.
    *G06N 20/00*     (2019.01)
    *G06F 16/28*     (2019.01)
    *G06F 16/22*     (2019.01)

(56) References Cited

U.S. PATENT DOCUMENTS

2019/0325475 A1* 10/2019 Wai ..................... G06N 20/00
2019/0349275 A1* 11/2019 Chen .................. H04L 12/403

OTHER PUBLICATIONS

Venetis, Petros et al., "Recovering semantics of tables on the web", Proceedings of the VLDB Endowment, v. 4, n. 9, p. 528-538, 2011.
Zhang, Ziqi., "Effective and efficient semantic table interpretation using tableminer+", Semantic Web, v. 8, n. 6, p. 921-957, 2017.
Miller, Renée J., "Open data integration", Proceedings of the VLDB Endowment, v. 11, n. 12, p. 2130-2139, 2018.

* cited by examiner

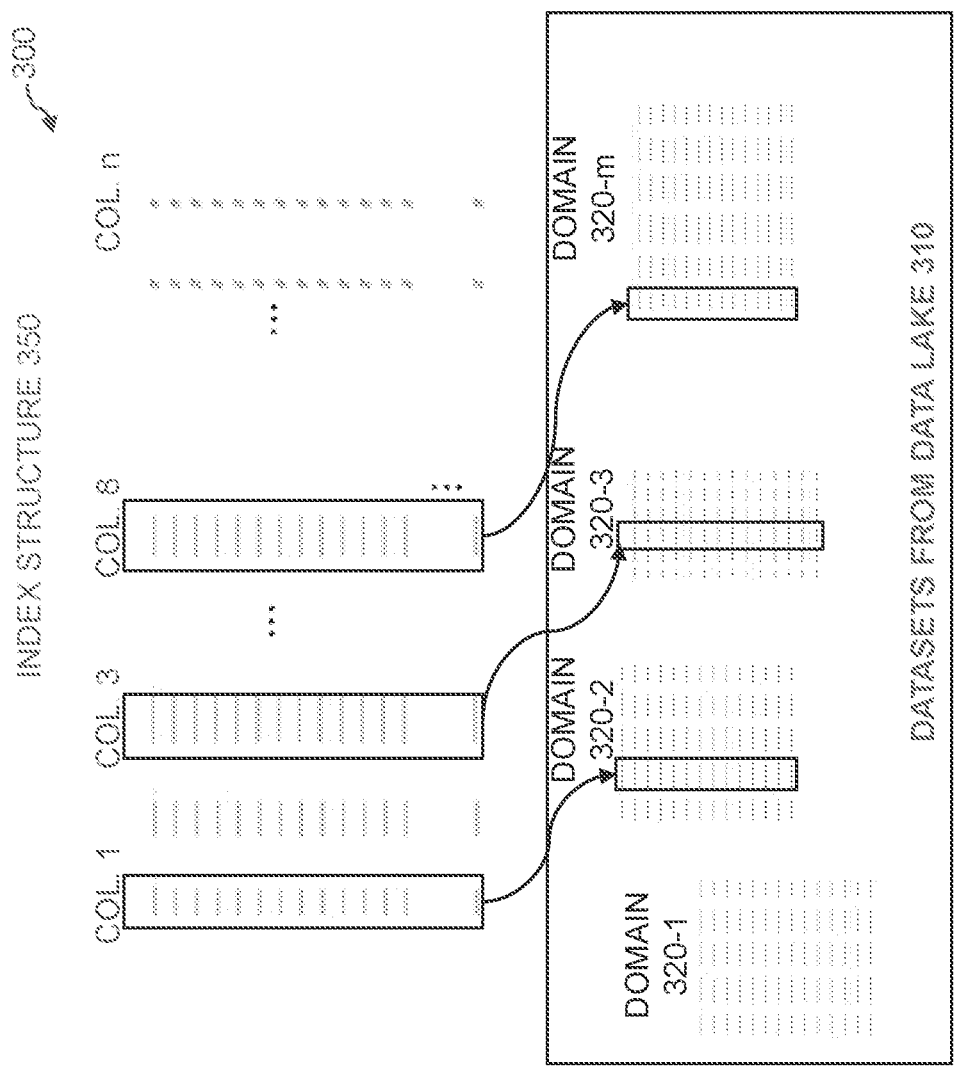

AUTOMATIC INDEXING OF RELEVANT DOMAINS IN A DATA LAKE FOR DATA DISCOVERY AND INTEGRATION

FIELD

The field relates generally to information processing techniques, and more particularly, to the processing of data in a data lake.

BACKGROUND

Several segments of an enterprise need to deal with increasingly large volumes of data produced, stored, and processed every day. Such data usually comes from a wide range of data sources and is typically stored in original form in a data repository, generally referred to herein as a data lake.

A need exists for a data management tool to provide users with a unified view of the data in such a data lake.

SUMMARY

In one embodiment, a method comprises obtaining a plurality of data files from a data lake, wherein each of the plurality of data files comprises a plurality of records having a plurality of fields; selecting a plurality of candidate fields from at least one of the data files based at least in part on a record type; determining a relevance score for each of the candidate fields from the at least one data file based at least in part on a plurality of features extracted from the at least one data file; and clustering the scored candidate fields into clusters of similar domains using a hashing algorithm, wherein a given cluster comprises one or more candidate fields, wherein a plurality of the data files can be integrated based at least in part on a corresponding domain of the candidate fields in the given cluster.

In some embodiments, the relevance score for each of the candidate fields is based at least in part on a plurality of features comprising: (i) features that take into account a morphological similarity between one or more of file name, file metadata and file records using natural language processing techniques; (ii) features that take into account a semantic similarity between one or more of file name, file metadata, and file records using ontology resources and natural language processing techniques; and/or (iii) features that take into account statistics of candidate fields in a data file that encompass one or more of a cardinality, a fraction of unique records and a field position in the data file.

In at least one embodiment, the clustering of the scored candidate fields into clusters of similar domains using the Locality-Sensitive-Hashing algorithm further comprises evaluating only fields having a relevance score above a predefined minimum threshold and removing clusters of similar domains that do not satisfy one or more predefined similarity criteria. The clusters of similar domains enable a user to write one or more queries to integrate two or more of the data files.

Other illustrative embodiments include, without limitation, apparatus, systems, methods and computer program products comprising processor-readable storage media.

BRIEF DESCRIPTION OF THE DRAWINGS

FIG. 3 illustrates a detection of similar domains given a query domain, according to at least one embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for data discovery and data integration.

Considering data lake files with a tabular structure, for example, the most relevant columns (or fields), among the set of columns in the data lake in question, are initially identified in some embodiments of the techniques for data discovery and data integration. Thereafter, columns with similar domains are grouped into clusters. A domain refers to the set of distinct values a given column may contain. In this way, each cluster will represent similar domains coming from different data sources. Finally, based on these similarities, a knowledge graph can be constructed which provides insights to the user, regarding best data integration options (e.g., equijoins and entity resolution operations). An equijoin is a join with a join condition containing an equality operator. An equijoin returns only the rows that have equivalent values for the specified columns.

Among other benefits, the disclosed framework for automatic indexing of relevant domains in a data lake improves data management, helping users to perform data analyses and to make business decisions.

Several enterprise segments use data lake solutions to store data generated by their applications. Depending on the data volume and structure (e.g., semi-structured or non-structured data), data management may become a complex task. In a variety of scenarios, enterprises adopt manual procedures to read and write data from files stored in their data lakes, which routinely compromise the identification of relationships between data sources and, consequently, any more sophisticated exploratory data analyses.

In view of this scenario, tools for data discovery and integration become crucial. Basically, such tools should provide the extraction of elements from the data sources present in the data lake, such that relationships between data sources are easily detected. In one or more embodiments, a column in a file with a tabular structure is regarded as an element, and, a domain refers to the set of distinct values that this element may contain.

Figure 1:
FIG. 1 illustrates a number of exemplary domains from a sample table, according to at least one embodiment of the disclosure.

FIG. 1 illustrates a number of exemplary domains from a sample table 100, according to at least one embodiment of the disclosure. In the example of FIG. 1, the Candidate Domains 150 for each column of the table 100 are shown.

Existing solutions often provide alternatives to automatically discover the main domain of a web table. One or more aspects of the disclosure recognize that a data lake file is, however, routinely comprised of many elements and, consequently, may have different relevant domains. Besides the discovery of elements and domains in data lake files, users (e.g., data scientists) typically need to relate data from different files, which can be time-consuming and error-prone since they need to be aware of the relationships between these files as well as the characteristics of the data, such as data types, values, and domains.

With these issues in mind, one or more embodiments of the present disclosure provide a computational framework for data discovery and integration in data lakes. Given a data lake where stored data has a tabular structure, the disclosed computational framework (i) identifies the most relevant columns, among the set of all columns in the data lake, and (ii) groups columns with similar domains into clusters. In this way, each cluster will represent similar domains coming from different data sources that can, for example, be used when performing join operations.

Figure 2A:
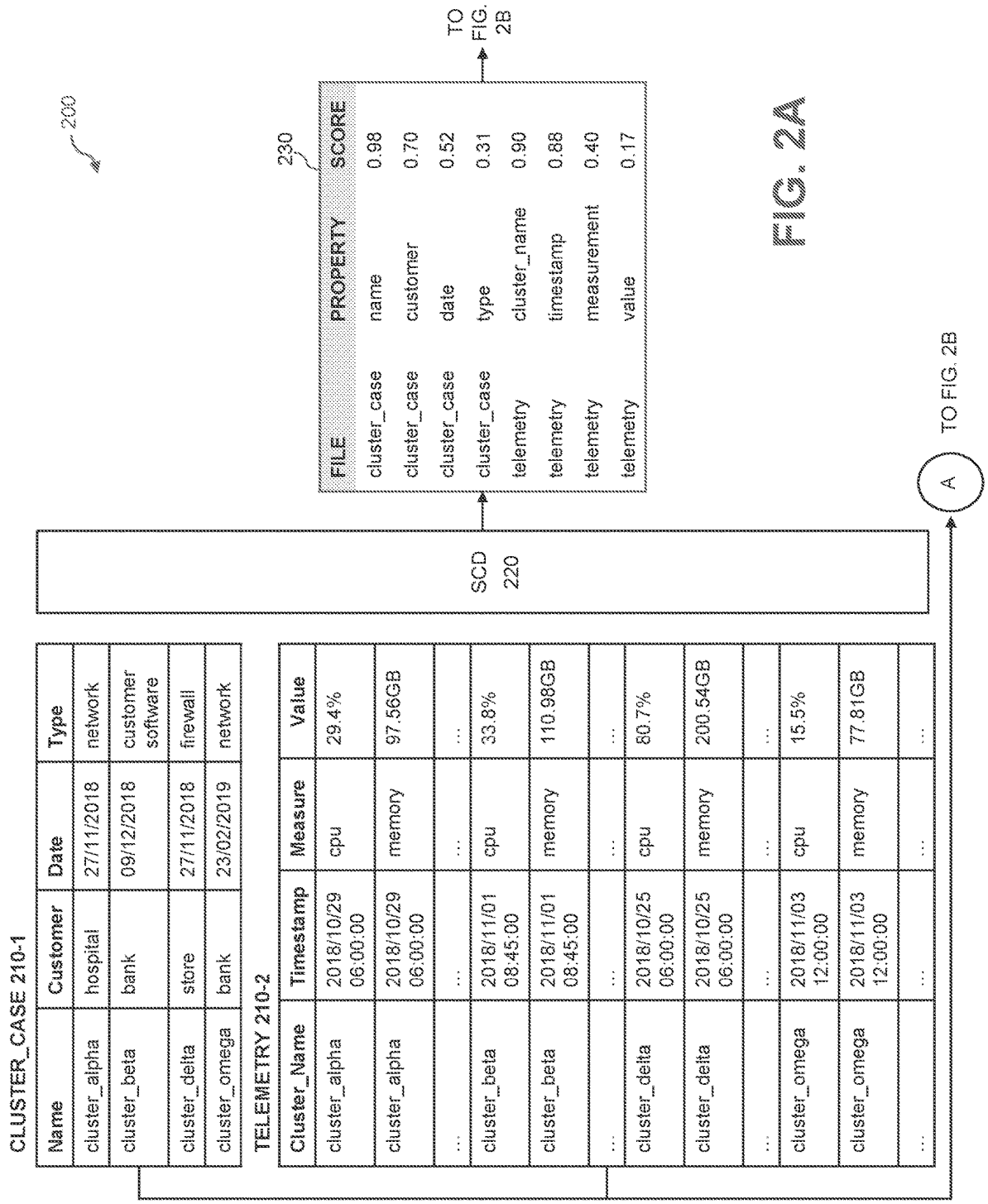
FIGS. 2A and 2B, collectively, illustrate an exemplary process for data discovery and integration in data lakes, according to one or more embodiments.
Figure 2B:
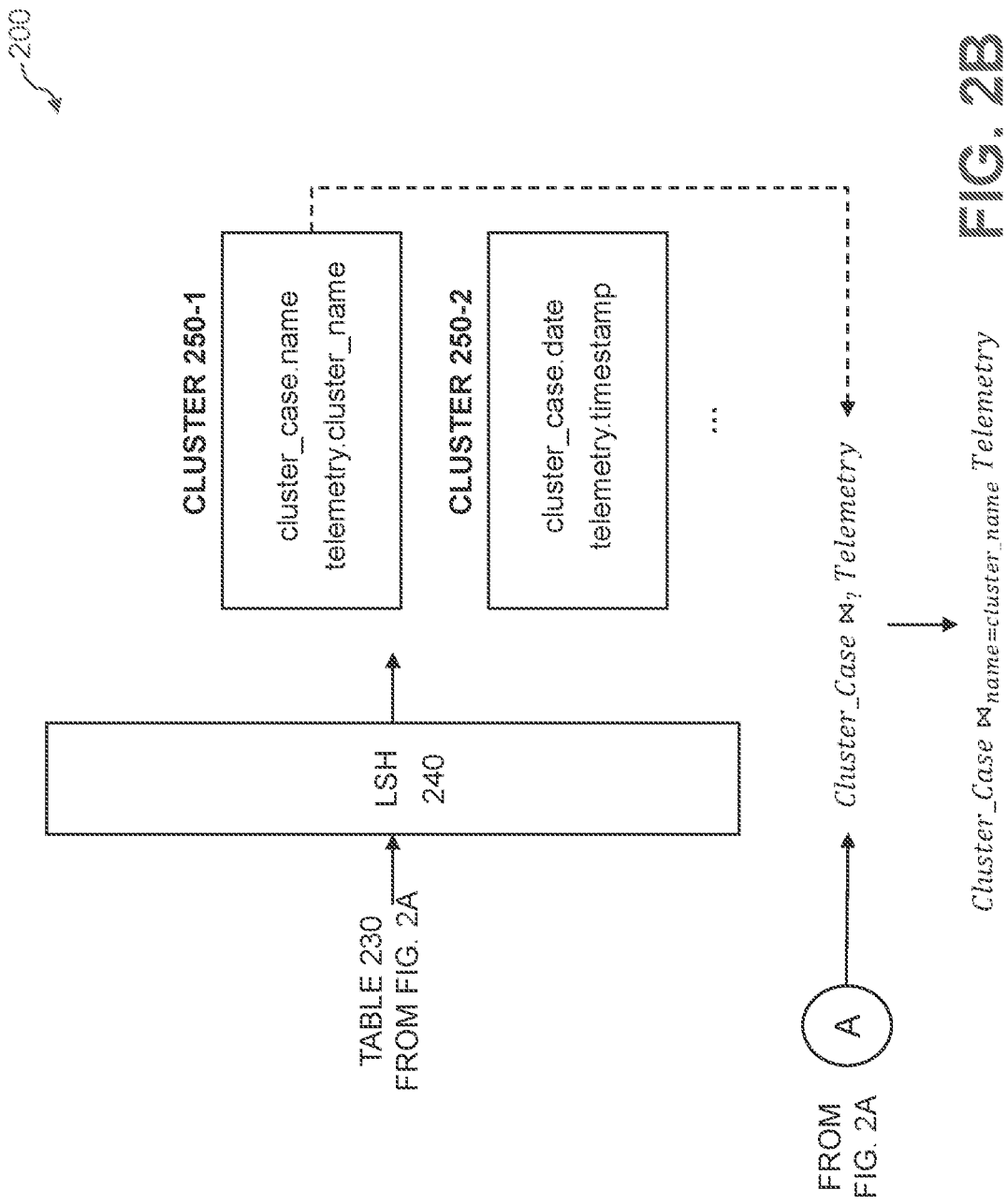

FIGS. 2A and 2B, collectively, illustrate an exemplary process 200 for data discovery and integration in data lakes, according to one or more embodiments. As shown in FIG. 2A, two exemplary data lake files 210-1, 210-2 with a tabular structure, named Cluster Case and Telemetry, respectively, are processed. The exemplary Cluster Case data lake file 210-1 refers to help desk cases opened for reporting anomalous behaviors in a storage cluster. The exemplary Telemetry data lake file 210-2 refers to the telemetry data gathered at runtime. It is noted that if one or more of the data lake files 210 of the data lake are not in tabular form, the data lake files 210 can be pre-processed into a tabular form, for example, before the data discovery and integration procedures commence, as would be apparent to a person of ordinary skill in the art.

A Subject Column Detection (SCD) algorithm 220 is applied to the two exemplary data lake files 210-1, 210-2 to assign a score, in some embodiments, to each column of the data lake files 210, as shown in table 230. In one or more embodiments, a Locality-Sensitive-Hashing (LSH) algorithm 240 is applied to the scored columns 230 to define high-quality groups (or clusters) 250 of similar columns between the two exemplary data lake files 210-1, 210-2, as shown in FIG. 2B. Finally, the identified clusters 250 help users to relate files and write queries for exploratory domain data analysis, such as a query that joins files Cluster Case 210-1 and Telemetry 210-2, by name (corresponding to cluster 250-1) and date (corresponding to cluster 250-2), as illustrated in FIG. 2B.

In one or more embodiments, the clusters 250 of similar columns can be used to generate a knowledge graph associated with files stored in data lakes, where vertices may correspond to the files and edges may correspond to relationships between files. With this graph, users can have more insights about the file domains and relationships between data lake files.

Data discovery and integration, in the scenario of data lakes, are often complex tasks for users, mainly due to the difficulty of understanding which files are related to each other and which files are good candidates for data integration operations. Therefore, the problem of identifying relationships between files in data lakes poses a number of challenges.

A repository comprising a large number of published structured files, such as structured files from the Open Data Initiative, affording either public or private access, and made available for a community, is generically called a data lake. Generally, a data lake is not a database, as a data lake crosses different boundaries of domains, naming conventions, and structuring approaches. Nonetheless, data lakes encompass files presenting some structure, including numbers, dates, names, and other traditional attribute types. As a repository, a data lake is a common point of access and deposit of files that can be used by a data scientist to discover relevant data for certain data analyses.

For a data scientist, however, discovering data may be a daunting task. The data scientist needs to be able to iteratively look at the data lake to find data that may be relevant to the analysis at hand, among millions of available files. Moreover, even if the data scientist manages to discover potential files of interest, the data scientist still needs to integrate the data within those files into a usable dataset. All these must accompany an iterative exploratory working mode, in which, at each iteration, the data scientist may want to test some hypothesis on the dataset built so far.

Given this context, in one or more embodiments of the present disclosure, techniques are provided to iteratively and efficiently discover and integrate data from a data lake to compose a data analysis dataset which is to be used by data scientists. The iterative dataset creation shall produce high recall since a more complete set of relevant data is obtained which leads to a richer and more efficient analysis.

During the development of new analyses, users commonly need to relate files from their data lakes for augmenting and/or aggregating new information. However, this kind of operation typically requires users to know the relationships between files, which is often a complex task, given the nature of the data stored in data lakes. More specifically, such data of interest may originate from different sources or even be derived from a chain of transformations upon other data. Therefore, if a methodology were adopted to support users understanding the information they possess and how they can use them in a data lake, users could be guided on the development of new exploratory data analyses that require relations to multiple files.

Without a common repository for storing information about the selected domains from files and the relationships between these files, users routinely manage the whole process (e.g., identification of the most relevant files based on their domains, selection of the related files, and a decision of the best relationships to be considered in user queries) by developing ad-hoc programs. Then, users basically need to face daily time-consuming and error-prone tasks, which may also require fine adjustments based on the input data lake. Therefore, a common repository (e.g., database) to store main insights about the data lake, would allow users to access this information to develop their exploratory data analyses. For instance, using a database management system, users could take advantage of indexing techniques and retrieve the knowledge graphs associated with a data lake, where vertices may correspond to the files and edges may correspond to relationships between these files.

A subject column has been referred to as the column whose domain expresses the subject of a table. For instance, the subject column of the table in FIG. 1 is the column Name, as the table is about people. Therefore, such a column may encompass the most relevant domain, and can be a good candidate to perform data discovery and data integration (e.g., equijoins and entity resolution operations). Some authors have addressed the detection of a unique subject column per table, focusing on a web scenario, using web tables and the context out of the table (text body in the same web page). However, in data lakes, files with a tabular structure usually present more than one subject column to express pertinent subjects, where the values of each subject column state one of the relevant domains of a file.

Therefore, for a data lake scenario, a computational framework is provided in one or more embodiments to detect more than one subject column per data file, through the SCD algorithm 220 of FIG. 2A, addressing issues inherent to data lakes, data discovery and data integration.

The LSH algorithm 240 of FIG. 2B, as described, for example, in Renee J. Miller, "Open Data Integration," Proc. of the VLDB Endowment, vol. 11, number 12, 2130-39 (2018), incorporated by reference herein in its entirety, uses a similar threshold parameter to define clusters of similar domains, whose relevance to each cluster is within a similar threshold, without the need for a pairwise comparison.

FIG. 3 illustrates a detection 300 of similar domains given a query domain, according to at least one embodiment. The detection 300 generates an index structure 350 that clusters similar domains from a data lake 310 for a given similarity parameter. The index structure 350 uses a signature that represents the similarity of each domain. As shown in FIG. 3, the data lake 310 comprises a set of categorical columns 1 through n (each with an associated domain 320-1 through 320-$m$). Therefore, in some embodiments, the organization of clustered domains is not exact and may contain false positives and false negatives. A false positive happens when a pair of domains are mapped into the same cluster, but the similarity is lower than the threshold for domain similarity. In the present disclosure, a framework is provided that uses the SCD algorithm 220 of FIG. 2A to decide which domains should be considered in the index generation step using the LSH algorithm 240 of FIG. 2B. Besides the allocation of similar domains in the same cluster, the disclosed framework also reduces the elapsed time for accessing these domains given a query, since data scientists do not need to search for these domains in the whole data lake.

Data Discovery and Data Integration

Figure 4:
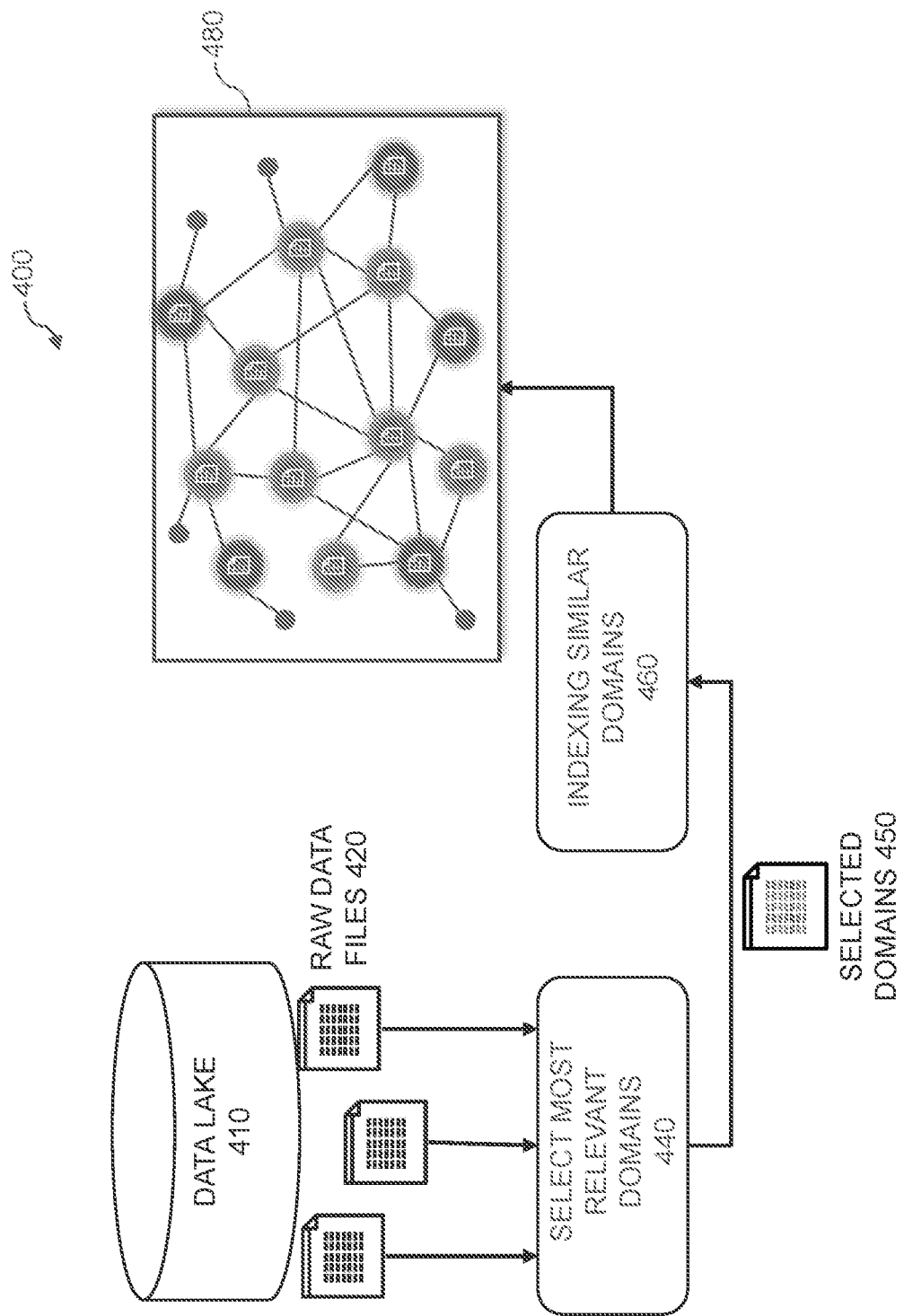
FIG. 4 illustrates an exemplary process for data discovery and data integration within a data lake, according to some embodiments of the disclosure.

As noted above, one or more embodiments of the disclosure provide a computational framework for a data lake scenario supporting users in data discovery and data integration. FIG. 4 illustrates an exemplary process 400 for data discovery and data integration within a data lake 410, according to some embodiments. Consider a task in which a user provides an initial set of raw data files 420 comprising tabular datasets D, and selects one column A (with its associated domain) in the dataset. The disclosed techniques for data discovery and data integration techniques find columns whose domains are similar to the domain of A in all datasets 420 from the data lake 410. A subset of relevant domains 450 is selected at stage 440 within the data lake 410, as discussed further below in conjunction with FIG. 5, which allows the user to find all domains that have high similarity with the domain of A in a more accurate and fast fashion. The selected similar domains 450 are indexed during step 460 and an index structure is adopted that copes with the data volume and variability, which are inherent characteristics of data lakes. Finally, based on these similarities, a knowledge graph 480 is generated that provides the user with insights regarding good data integration options, e.g., equijoin and entity resolution operations.

Detecting Relevant Domains in Data Lake Files

As discussed above in conjunction with FIG. 4, a portion of the disclosed techniques for data discovery and data integration detect relevant domains in files stored in data lakes, such as the data lake 410. Such detection can support users by filtering relevant subject columns to be used for data discovery and data integration.

Figure 5:
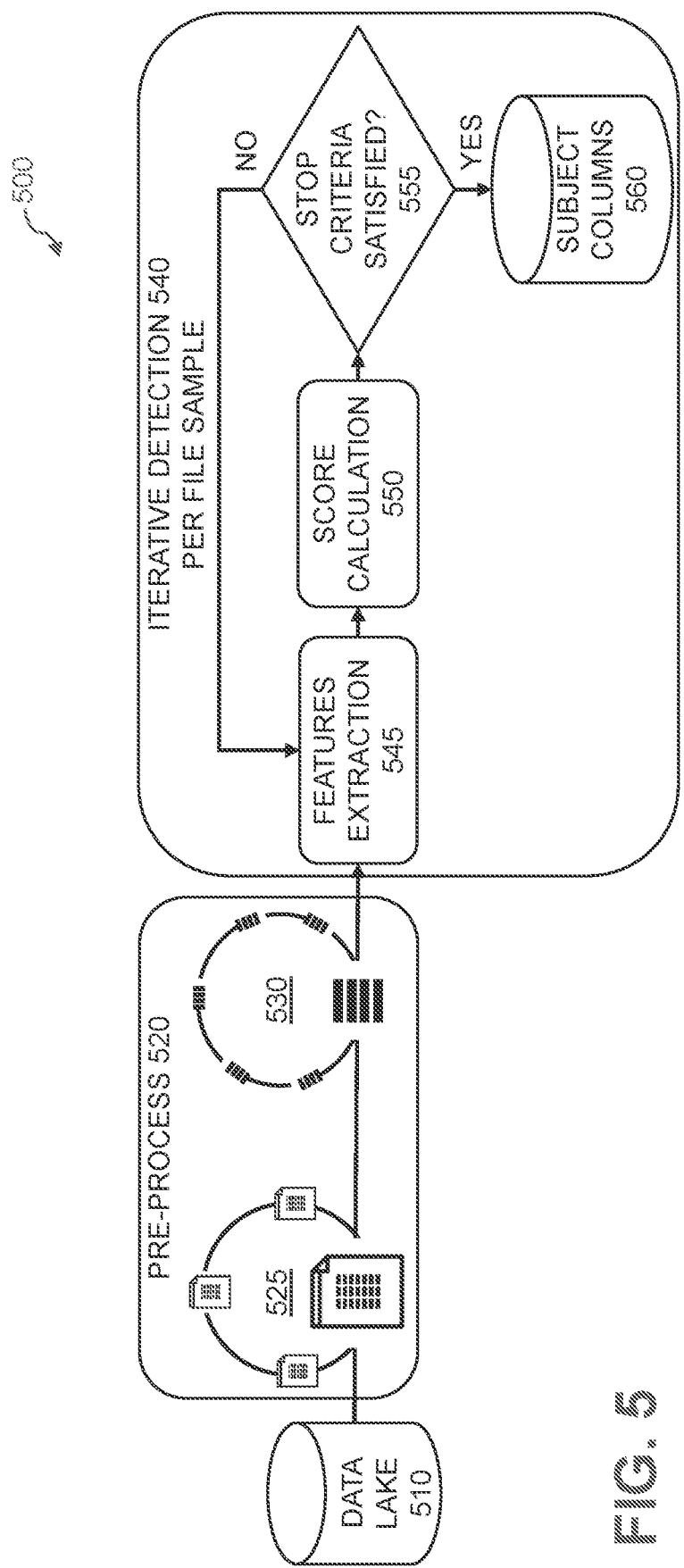
FIG. 5 illustrates a detection of relevant domains in data lake files from a data late by the SCD alogrithm of FIG. 2A, according to one or more embodiments.

FIG. 5 illustrates a detection 500 of relevant domains in data lake files from a data late 510 by the SCD algorithm 220 of FIG. 2A, according to one or more embodiments. The exemplary SCD algorithm 220 encompasses two main stages, as follows: a pre-process stage 520 and an iterative detection 540 per file sample, as shown in FIG. 5.

In the pre-process stage 520, the pre-processing iterates during step 525 over the data lake files that present a tabular structure. In this iteration, SCD algorithm 220 shuffles the registers of each file, which allows working later with more representative file samples. For each iterated file, SCD also iterates during step 530 over the file columns samples, to select a set of candidate columns according to their register types. In order to detect subject columns, only columns of string type are selected as candidates.

Next, in the iterative detection stage 540 per file sample, the SCD algorithm 220 initializes the detection of subject columns itself. Working in an iterative fashion is a common practice. See, for example, Ziqi Zhang, "Effective and Efficient Semantic Table Interpretation Using Tableminer+" Semantic Web, vol. 8, no. 6, 921-57 (2017); and/or Metros Venetis et al., Recovering Semantics of Tables on the Web, Proc. of the VLDB Endowment, vol. 4, no. 9, 528-38 (2011), each incorporated by reference herein in its entirety. Considering that data lakes may have many large files, the iteration over file samples during stage 540 avoids performing a full scan on files, prevents memory resource bottlenecks, and substantially guarantees fast detection achievements. During the iterative process for each candidate, features are extracted during step 545, and a score is calculated during step 550. Features are calculated that impact on the score of the subject column status. The iteration process stops during step 555 and provides the subject columns 560, for example, when the rank per score of the candidates reaches an entropy convergence, which could be a stop criterion representing the n subsequent iterations with a stable rank of candidates per file. For instance, table 230 in FIG. 2A shows the most relevant columns (e.g., with the highest scores) detected by SCD algorithm 220, given an exemplary data lake generated for monitoring telemetry data.

Domain Features for Column Similarity

In the detection of relevant domains, features are calculated for each candidate domain. Such features could indicate subject columns so that they are input to the calculation of a score in order to state the probability of the candidate to be a subject column. In some embodiments, the values of such features are calculated considering the following aspects:

morphological similarities: features that take into account the morphological similarity between file name, file metadata and file records, using natural language processing techniques;

semantic similarities: features that take into account the semantic similarity between file name, file metadata, and file registers, using ontology resources and natural language processing techniques; and data statistics: features that take into account the statistics of candidate columns in a file, which encompass the cardinality, the fraction of unique registers and the column position in the file.

Weights for Domain Features

The features given as input to SCD algorithm 220 characterize different aspects of the candidate columns, where each one of the applied features contributes to calculate a score for each candidate column. However, some features are typically more relevant than others and this is reflected in how they should add value to the final score of the column they were extracted from.

At first glance, this value or importance of a domain feature could be defined as weights by users with some heuristic of his or her choice. This task is not an exact science and then it is ideal that these weights are learned by a supervised learning algorithm, which can more precisely identify the patterns that characterize the relevant columns. For instance, a Random Forest model could be used in this step. This ensemble machine learning method is efficient since it can effectively rank the importance of variables in classification problems, and then, as used herein, the developer can adopt these values as the weights of the features in the calculus of the score. In this learning phase, each candidate column is represented as a feature vector and is given to the algorithm as input, which will assess whether or not the column is relevant.

Learning the weights for each feature with the adoption of a supervised machine learning algorithm for SCD algorithm 220 is one contribution of the present disclosure, since users do not need to choose these weights by themselves, which is error-prone, and the correctness of values is not guaranteed. Finally, by adopting a machine learning approach for weight computation, the disclosed techniques for data discovery and data integration are applicable to any data lake independent of user knowledge.

In one exemplary embodiment, the relevance score for each candidate column from the data file based on the features extracted from the data file may be computed, as follows:

Subject Colum Score=$w_{fr}(fr)+w_{dr}(dr)-w_{flr}(flr)-w_{er}(er)-w_{fp}(fp)$, where are the weights predicted by the machine learning model for each of the following ememplary features:

| Label | Domain Feature | Description |
|---|---|---|
| fr | Field Relationships | Number of identified semantic relationships between the field in question and other fields in the same raw data file |
| dr | Distinct Records | Ratio of distinct values of the field in question to the number of records in the raw data file |
| flr | Frequent Labeled Records | % of records of the most frequent ontology label type. The following ontology labels are considered: 'DATE', 'TIME', 'PERCENT', 'MONEY', 'QUANTITY', |

-continued

| Label | Domain Feature | Description |
|---|---|---|
| er | Empty Records | 'ORDINAL', 'CARDINAL' % of empty records of the field in question |
| fp | Field Position | Number of fields that come before (left-right orientation) the field in question in the raw data file |

Data Discovery and Integration Support

Figure 6:
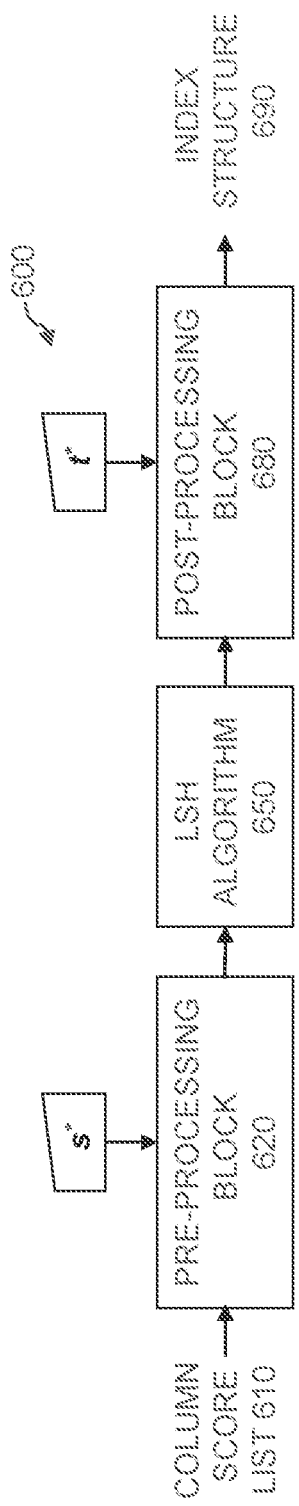
FIG. 6 illustrates an exemplary implementation of the LSH algorithm of FIG. 2B in further detail, according to at least one embodiment of the disclosure.

FIG. 6 illustrates an exemplary implementation 600 of the LSH algorithm 240 of FIG. 2B in further detail, according to at least one embodiment of the disclosure. As shown in FIG. 6, the exemplary implementation 600 of the LSH algorithm 240 obtains a column score list 610 from the SCD algorithm 220 of FIGS. 2A and 5, with the score of each subject column for the files in the processed data lake(s).

The exemplary implementation 600 of the LSH algorithm 240 of FIG. 2B comprises a pre-processing block 620, the LSH algorithm 650, and a post-processing block 680, each discussed further below. As noted above, an implementation of the LSH algorithm 650 is described, for example, in Renee J. Miller, "Open Data Integration," Proc. of the VLDB Endowment, vol. 11, number 12, 2130-39 (2018), incorporated by reference herein in its entirety. The exemplary LSH algorithm 650 uses a similar threshold parameter to define clusters of similar domains, whose relevance to each cluster is within a similar threshold, without the need for a pairwise comparison.

Generally, given the column score list 610, the exemplary implementation 600 of the LSH algorithm 240, in one or more embodiments, selects only relevant domains and the LSH algorithm 650 creates an index structure 690 for providing a direct and faster access to subject columns of similar domain(s). In some embodiments, indexes are created only for relevant domains (from the selected subject columns).

In one or more embodiments, users define two parameters as inputs for the exemplary implementation 600 of the LSH algorithm 240: (i) a minimum SCD score s*, which is used by pre-processing block 620 to select only relevant domains (or subject columns) before starting the index generation process; and (ii) a minimum Jaccard t*, which is used by post-processing block 680 to create the index structure and to cluster similar domains for the given threshold t*, as shown in FIG. 6 and discussed hereinafter.

Filtering Out Input Domains for LSH

The data lake is characterized by a large set of files without any information about the relevance of their domains. Thus, if all columns from these files are used, the results of the index generation process should generate clusters of domains that are not so similar. Based on this problem, one or more embodiments of the disclosed techniques for data discovery and data integration calculate SCD score values for each domain in the data lake. For instance, domains with redundant data, missing data, and insufficient data are characteristics that define low SCD scores. In this scenario, users routinely want to eliminate such domains from their quest for new knowledge. Thus, the exemplary implementation 600 of the LSH algorithm 240 shown in FIG. 6 allows users to define a minimum SCD score s*, which is used by pre-processing block 620 to select only relevant domains (or subject columns) before starting the index generation process.

Figure 7:
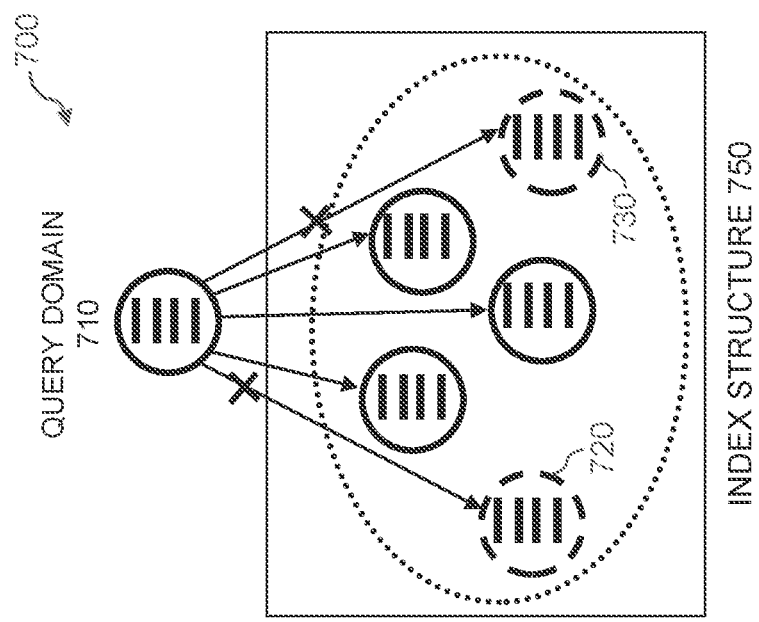
FIG. 7 illustrates an example of a search space reduction given by the SCD column scores, according to some embodiments of the disclosure.

FIG. 7 illustrates an example of a search space reduction 700 given by the SCD column scores, according to some embodiments of the disclosure. As shown in FIG. 7, a query domain 710 is processed and the SCD scores generated by the SCD algorithm are used to reduce the search space, based on the user-defined minimum SCD score s*, to filter out irrelevant domains 720, 730, based on the user-defined minimum SCD score, before the generation of the index structure 750, according to some embodiments. Therefore, since the most relevant domains have been selected, the disclosed framework can cluster the relevant domains using the LSH algorithm of FIG. 6.

Knowledge Graph

Users require the discovery of data that joins, unions, or aggregates with their query dataset. Thus, for a given query dataset Q ($A_1, A_2, \ldots, A_n$), where $A_i$ is a column in the dataset Q, a joinable dataset J($A_1', A_2', \ldots, A_m'$) is a relation to dataset Q($A_1 A_2 \ldots, A_n$) where at least one column $A_i$ in Q has a domain similar to a domain of a column $A_k'$ in J, where $1 \le i \le n$ and $1 \le k \le m$. Focused on this need, one or more embodiments create a knowledge graph, where vertices may correspond to the files and edges may correspond to relationships between files. This knowledge graph can also take advantage of the outcome of the disclosed framework, i.e., the clusters of similar domains from the analyzed files stored in data lakes.

FIG. 2B shows the outcomes of the disclosed approach that can be used for generating a knowledge graph associated with files stored in data lakes, where vertices may correspond to the files and edges may correspond to relationships between files. With this graph, users can have more insights about the file domains and relationships between data lake files. FIG. 2B also presents an example of a query that takes advantage of the output of LSH (and this abstraction of knowledge graph) given an exemplary data lake for monitoring telemetry data.

Figure 8:
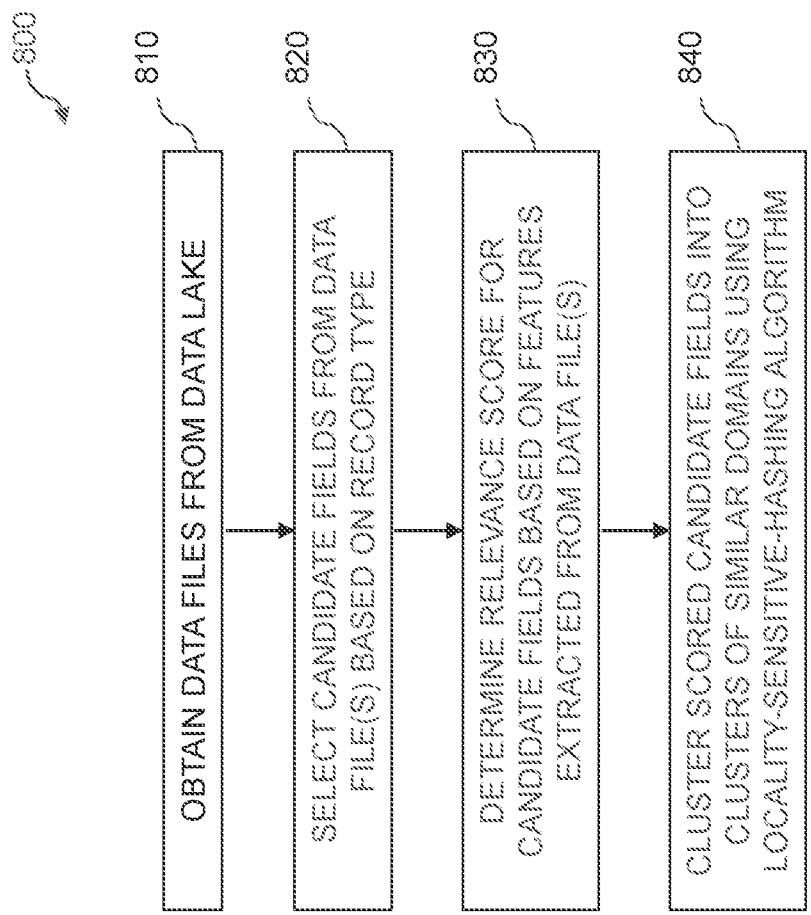
FIG. 8 is a flow chart illustrating an exemplary implementation of a data discovery and data integration process, according to one embodiment.

FIG. 8 is a flow chart illustrating an exemplary implementation of a data discovery and data integration process 800, according to one embodiment of the disclosure. As shown in FIG. 8, the exemplary data discovery and data integration process 800 initially obtains data files from a data lake during step 810. Generally, each data file comprises a plurality of records having a plurality of fields. During step 820, candidate fields are selected from at least one of the data files based on a record type (e.g., a string record type), The exemplary data discovery and data integration process 800 then determines a relevance score for each of the candidate fields during step 830 from one or more data file based on features extracted from the one or more data file. Finally, the scored candidate fields are clustered into clusters of similar domains during step 840 using a Locality-Sensitive-Hashing algorithm. A given cluster comprises one or more candidate fields, and multiple data files can be integrated based on a corresponding domain of the candidate fields in the given cluster.

EXAMPLE

The generation of large volumes of data is now quite common given the variety of enterprise segments that ingest and process more and more data on a daily basis at high speed. Therefore, data analysis is a key task to provide the investigation of the outcomes of their processes and to help decision making. For instance, in the public health sector, data concerning patients and medical records and prescriptions may be good indicators of this sector's operation. Moreover, the understanding of this information could serve as a starting point to the definition of new measures that will improve the quality of this service.

However, besides their large volume, public health data may be complex, redundant and dirty. They usually lack a single, standard schema and may originate from different sources. Therefore, generating reliable, valuable knowledge from them is complicated and, consequently, it is necessary to know which data are relevant and how they relate to each other. Considering these circumstances, this task is tricky and practically impossible to be manually done by the user. Therefore, the adoption of a support tool for data discovery and integration is strictly paramount.

Among other benefits, the disclosed techniques for data discovery and data integration provide users with a better way to work with data lake files and to proceed with data discovery and integration.

One or more embodiments of the disclosure provide an algorithm, framework and related systems for the detection of relevant domains in data lake files. The detection process is focused in at least some embodiments on the scenario of data lakes that encompass semi-structured and non-structured files. The features used to calculate the score/degree of relevance of domains cover not only the statistics of the data in the file, but also semantic similarities. Such similarities are calculated in some embodiments without consulting large knowledge bases, which have instances of ontological classes. Instead, the ontology classes are used at a higher level than the instances, querying a smaller knowledge base, which can save processing elapsed time and do not harm the quality of the results. Thus, the present disclosure discovers relevant domains based on the elimination of noisy data. In addition, a smaller volume of data is provided to be queried by the user, which may facilitate the development of new queries.

Besides the capability of detecting relevant domains from data lake files, the disclosed data discovery and data integration framework also provides the identification of implicit relationships between these files, which enables the user to perform data analyses. The combination of SCD and LSH provides a powerful tool for data discovery and integration. Using the scores calculated by SCD as a threshold is a new, substantially efficient way of filtering the commonly big amount of data LSH is meant to cluster, which is a significant contribution. Without the previous data cleansing performed by subject columns detection, traditional LSH faces the difficulty of handling the noisy and dirty data present in data lakes, which certainly diminishes the quality of data integration.

Thus, the disclosed detection of implicit relationships between different domains in data lakes enables users to perform the steps necessary to perform their exploratory domain data analysis. This is possible due to the ability of LSH to cluster domains that are similarly allied with the quantification of the domains' relevance. Moreover, it evidences which are the most appropriate candidates for join operations.

Further, when combining SCD and LSH in the disclosed approach, the relevant domains are selected from files and an index structure is generated to improve data access and cluster similar domains. As a result, the outcomes of the disclosed approach can be used for generating a knowledge graph associated with files stored in data lakes, where vertices may correspond to the files and edges may correspond to relationships between files. With this graph, users can have more insights about the file domains and relationships between data lake files. Therefore, they do not need to investigate all data lake files to understand their relationships or even the available domains, since the knowledge graph delivers a summary of the most relevant relationships. The disclosed approach in some embodiments thus facilitates the development of new queries by users.

One or more embodiments of the disclosure provide improved methods, apparatus and computer program products for data discovery and data integration. The foregoing applications and associated embodiments should be considered as illustrative only, and numerous other embodiments can be configured using the techniques disclosed herein, in a wide variety of different applications.

It should also be understood that the disclosed data discovery and data integration techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for data discovery and data integration may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based data discovery and data integration engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based data discovery and data integration platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
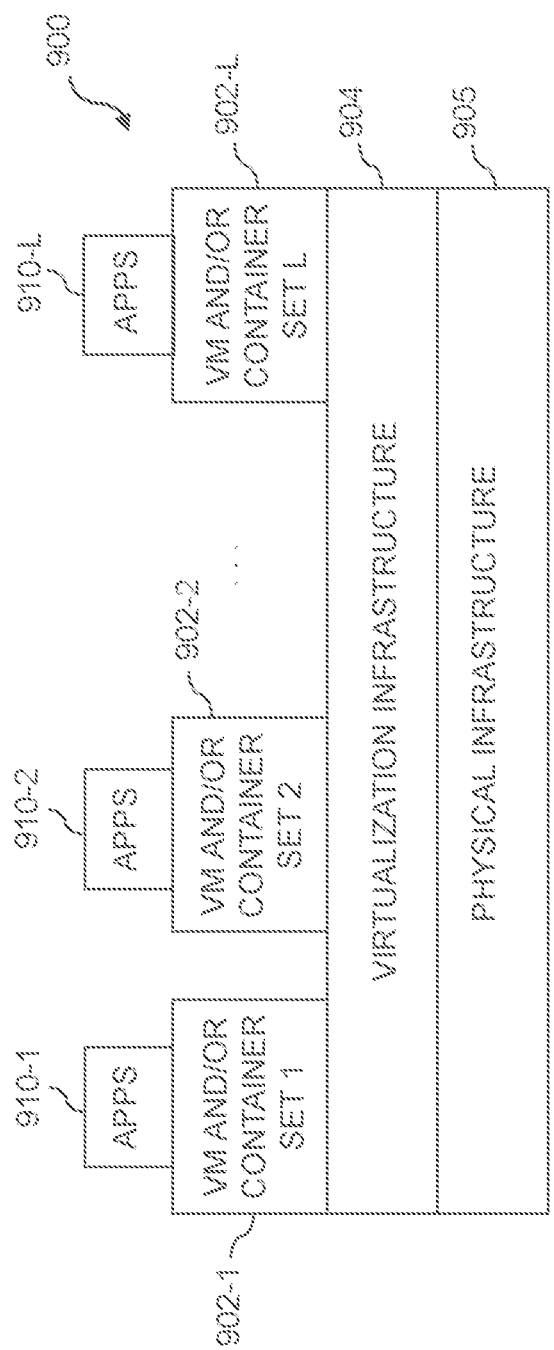
FIG. 9 illustrates an exemplary processing platform that may be used to implement at least a portion of one or more embodiments of the disclosure comprising a cloud infrastructure.

FIG. 9 shows an example processing platform comprising cloud infrastructure 900. The cloud infrastructure 900 comprises a combination of physical and virtual processing resources that may be utilized to implement at least a portion of an information processing system. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide data discovery and data integration functionality of the type described above for one or more processes running on a given one of the VMs. For example, each of the VMs can implement data discovery and data integration control logic and associated selection of relevant domains for enabling data discovery and data integration for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide data discovery and data integration functionality of the type described above for one or more processes running on different ones of the containers. For example, a container host device supporting multiple containers of one or more container sets can implement one or more instances of data discovery and data integration control logic and associated selection of relevant domains for enabling data discovery and data integration.

As is apparent from the above, one or more of the processing modules or other components of a data discovery and data integration system may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Figure 10:
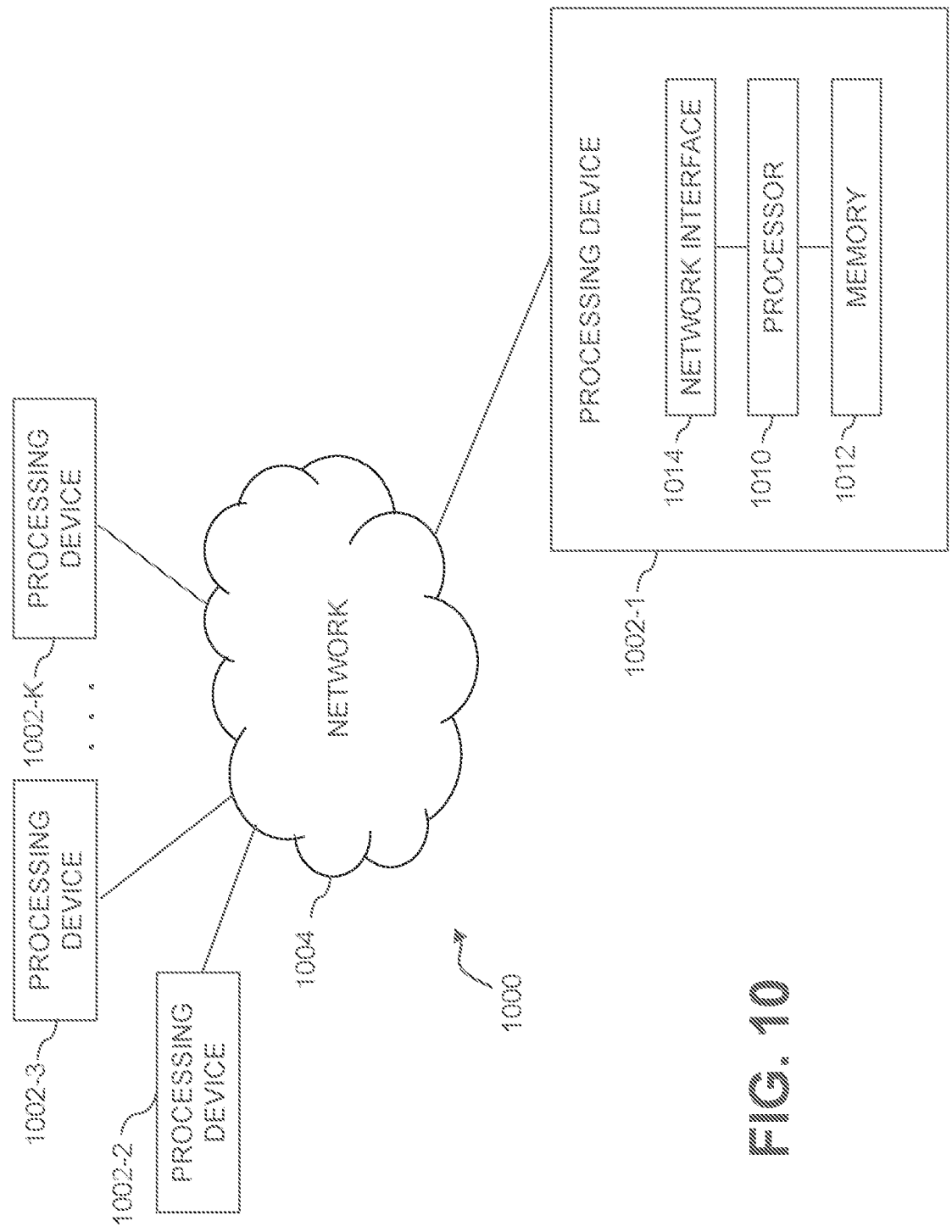
FIG. 10 illustrates another exemplary processing platform that may be used to implement at least a portion of one or more embodiments of the disclosure.

Multiple elements of an information processing system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a plurality of data files from a data lake, wherein each of the plurality of data files comprises a plurality of records having a plurality of fields;
    selecting a plurality of candidate fields from at least one of the data files based at least in part on a record type;
    determining a relevance score for each of the candidate fields from the at least one data file based at least in part on a plurality of features extracted from the at least one data file; and
    clustering the scored candidate fields into clusters of similar domains using a hashing algorithm, wherein a given cluster comprises one or more candidate fields, wherein a plurality of the data files can be integrated based at least in part on a corresponding domain of the candidate fields in the given cluster;
wherein the method is performed by at least one processing device comprising a processor coupled to a memory.

2. The method of claim 1, wherein each of the plurality of candidate fields selected from the at least one data file has a string record type.

3. The method of claim 1, wherein the relevance score for each of the candidate fields is based at least in part on a plurality of weighted features extracted from the at least one data file, and wherein the weights for the plurality of weighted features are learned using a supervised learning algorithm.

4. The method of claim 1, wherein the relevance score for each of the candidate fields is based at least in part on a plurality of features comprising one or more of: (i) features that take into account a morphological similarity between one or more of file name, file metadata and file records using natural language processing techniques; (ii) features that take into account a semantic similarity between one or more of file name, file metadata, and file records using ontology resources and natural language processing techniques; and (iii) features that take into account statistics of candidate fields in a data file that encompass one or more of a cardinality, a fraction of unique records and a field position in the data file.

5. The method of claim 1, further comprising shuffling a plurality of records of one or more of the plurality of data files.

6. The method of claim 1, wherein the hashing algorithm comprises a Locality-Sensitive-Hashing algorithm and the clustering of the scored candidate fields into clusters of similar domains using the Locality-Sensitive-Hashing algorithm further comprises evaluating only fields having a relevance score above a predefined minimum threshold and removing clusters of similar domains that do not satisfy one or more predefined similarity criteria.

7. The method of claim 1, further comprising generating a knowledge graph where vertices correspond to the data files and edges correspond to relationships between data files to provide one or more insights for file domains and relationships between the data files.

8. The method of claim 1, wherein the clusters of similar domains enable a user to write one or more queries to integrate two or more of the data files.

9. The method of claim 1, wherein the hashing algorithm comprises a locality-sensitive hashing algorithm.

10. An apparatus comprising:
at least one processing device comprising a processor coupled to a memory;
the at least one processing device being configured to implement the following steps:
obtaining a plurality of data files from a data lake, wherein each of the plurality of data files comprises a plurality of records having a plurality of fields;
selecting a plurality of candidate fields from at least one of the data files based at least in part on a record type;
determining a relevance score for each of the candidate fields from the at least one data file based at least in part on a plurality of features extracted from the at least one data file; and
clustering the scored candidate fields into clusters of similar domains using a hashing algorithm, wherein a given cluster comprises one or more candidate fields, wherein a plurality of the data files can be integrated based at least in part on a corresponding domain of the candidate fields in the given cluster.

11. The apparatus of claim 10, wherein the relevance score for each of the candidate fields is based at least in part on a plurality of weighted features extracted from the at least one data file.

12. The apparatus of claim 10, further comprising shuffling a plurality of records of one or more of the plurality of data files.

13. The apparatus of claim 10, wherein the hashing algorithm comprises a Locality-Sensitive-Hashing algorithm and the clustering of the scored candidate fields into clusters of similar domains using the Locality-Sensitive-Hashing algorithm further comprises evaluating only fields having a relevance score above a predefined minimum threshold and removing clusters of similar domains that do not satisfy one or more predefined similarity criteria.

14. The apparatus of claim 10, further comprising generating a knowledge graph where vertices correspond to the data files and edges correspond to relationships between data files to provide one or more insights for file domains and relationships between the data files.

15. The apparatus of claim 10, wherein the clusters of similar domains enable a user to write one or more queries to integrate two or more of the data files.

16. A non-transitory processor-readable storage medium having stored therein program code of one or more software programs, wherein the program code when executed by at least one processing device causes the at least one processing device to perform the following steps:
obtaining a plurality of data files from a data lake, wherein each of the plurality of data files comprises a plurality of records having a plurality of fields;
selecting a plurality of candidate fields from at least one of the data files based at least in part on a record type;
determining a relevance score for each of the candidate fields from the at least one data file based at least in part on a plurality of features extracted from the at least one data file; and
clustering the scored candidate fields into clusters of similar domains using a hashing algorithm, wherein a given cluster comprises one or more candidate fields, wherein a plurality of the data files can be integrated based at least in part on a corresponding domain of the candidate fields in the given cluster.

17. The non-transitory processor-readable storage medium of claim 16, wherein the relevance score for each of the candidate fields is based at least in part on a plurality of weighted features extracted from the at least one data file.

18. The non-transitory processor-readable storage medium of claim 16, wherein the hashing algorithm comprises a Locality-Sensitive-Hashing algorithm and the clustering of the scored candidate fields into clusters of similar domains using the Locality-Sensitive-Hashing algorithm further comprises evaluating only fields having a relevance score above a predefined minimum threshold and removing clusters of similar domains that do not satisfy one or more predefined similarity criteria.

19. The non-transitory processor-readable storage medium of claim 16, further comprising generating a knowledge graph where vertices correspond to the data files and edges correspond to relationships between data files to provide one or more insights for file domains and relationships between the data files.

20. The non-transitory processor-readable storage medium of claim 16, wherein the clusters of similar domains enable a user to write one or more queries to integrate two or more of the data files.

* * * * *